United States Patent
An

(10) Patent No.: US 8,113,338 B2
(45) Date of Patent: Feb. 14, 2012

(54) WEAR-RESISTANT, CONTINUOUS, FLEXIBLE TRANSFER BELT

(75) Inventor: Shu An, Suzhou (CN)

(73) Assignee: Suzhou Slac Precision Equipment Inc. (CN)

( * ) Notice: Subject to any disclaimer, the term of this patent is extended or adjusted under 35 U.S.C. 154(b) by 90 days.

(21) Appl. No.: 12/639,441

(22) Filed: Dec. 16, 2009

(65) Prior Publication Data

US 2011/0139591 A1    Jun. 16, 2011

(51) Int. Cl.
*B65G 47/04* (2006.01)
(52) U.S. Cl. .................... 198/803.14; 198/847
(58) Field of Classification Search ............ 198/867.11, 198/867.12, 803.14, 847
See application file for complete search history.

(56) References Cited

U.S. PATENT DOCUMENTS

| | | | | |
|---|---|---|---|---|
| 4,946,028 | A * | 8/1990 | Eichmann et al. | 198/803.15 |
| 5,282,531 | A * | 2/1994 | Zysset | 198/803.14 |
| 5,668,307 | A * | 9/1997 | Wade | 73/40.7 |
| 6,695,132 | B2 * | 2/2004 | Cook et al. | 198/832.1 |

* cited by examiner

*Primary Examiner* — James R Bidwell
(74) *Attorney, Agent, or Firm* — Cantor Colburn LLP

(57) ABSTRACT

A continuous, flexible transfer belt is disclosed. The transfer belt may be used in a transfer system for a progressive press, and is particularly suited for the transfer of easy open can ends. The transfer belt includes at least one lane that extends along an axis of the belt. The at least one lane has a plurality of openings therein that are configured to receive an easy open end. The transfer belt includes a flexible material and has a wear resistant layer that includes a wear resistant material. The wear resistant layer is disposed proximate an upper surface of the belt and extends outwardly from the opening, wherein the wear resistant layer underlies an outer rim of the easy-open end.

19 Claims, 4 Drawing Sheets

WEAR-RESISTANT, CONTINUOUS, FLEXIBLE TRANSFER BELT

TECHNICAL FIELD

The present invention relates generally to a flexible, wear-resistant transfer belt. More particularly, it relates to a flexible, wear-resistant transfer belt for use in a workpiece transfer system of a press comprising multi-lane progressive die stamping tools, and even more particularly to a flexible, wear-resistant transfer belt in a system for transferring easy-open can ends through a press comprising multi-lane progressive stamping tools for producing easy-open can ends, such as those used in the canned food and beverage industries.

BACKGROUND OF THE INVENTION

Continuous conveyor or transfer belts are employed in the transfer systems used in conversion presses for making easy-open can ends that provide sealed closure of cans for the canned food and beverage industries. These transfer systems transport the easy-open ends through and between tooling stages at which various forming or assembly operations are performed on them. Continuous belts are used in various types of conversion presses, including those designed for the high volume manufacture of easy-open can ends used for closure of cans for soft drinks alcoholic and other beverage and the like The flexible transfer belts that are currently used on easy-open end production equipment are generally made of either rubber or polymer materials. These transfer belts operate at high speeds and may employ various holding mechanisms to hold the easy-open ends in place as they are transported intermittently through the conversion presses. One such mechanism comprises a vacuum system used to hold the easy-open ends in place in circular openings in the belts as these parts travel through the tooling. The easy-open ends nest inside the circular openings in the transfer belt with the outer rim of the ends resting on the upper surface of the belt around the circular opening. The vacuum systems generally apply a normal suction force that compresses the outer rim of the end against the upper surface of the belt. During various parts of the forming process, particularly those that occur after the formation of the curled lip that is used for sealing the end to a can, the curled lip has a relatively sharp outer edge. Over time, by the action of the outer edge against the belt surface, a ring-shaped groove is worn into the upper surface of the transfer belt around the openings. The curled lips of the easy-open ends sink into the ring-shaped groove thereby affecting the performance of the transfer belts, transfer systems, and conversion presses and necessitating the replacement of the transfer belts. Thus, the wear of the transfer belts reduces their operating lifetimes and may result in reduced quality of the easy-open ends and undesirable scrap.

It is desirable, therefore, to provide transfer belts have enhanced wear-resistance around the circular openings and improved belt operating lifetimes.

SUMMARY OF THE INVENTION

In general terms, this invention provides a wear-resistant, continuous, flexible transfer belt. The wear-resistant, continuous, flexible transfer belt includes at least one lane that extends along an axis of the belt. The at least one lane has a plurality of openings therein that are configured to receive an easy open end. The transfer belt includes a flexible material and a wear resistant layer comprising a wear resistant material. The wear resistant layer is disposed proximate an upper surface of the belt extending outwardly from the opening, wherein the wear resistant layer underlies an outer rim of the easy-open end.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF A PREFERRED EMBODIMENT

These and other features and advantages of this invention will become more apparent to those skilled in the art from the detailed description of a preferred embodiment. The drawings that accompany the detailed description are described below.

Figure 1:
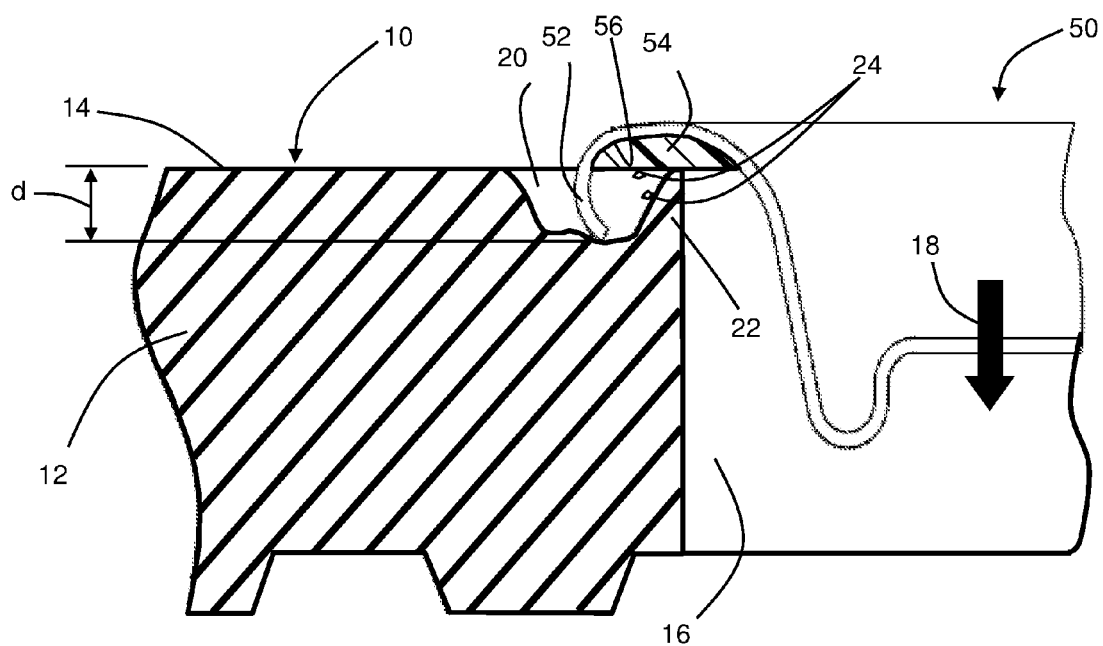
FIG. 1 is a cross-sectional view illustrating a prior art continuous, flexible transfer belt in a worn condition.

Referring to FIG. 1, the flexible transfer belts 10 currently used in the transfer systems of production equipment (not shown) for manufacturing easy-open can ends or lids 50, such as those used for enclosing a wide variety of beverage and other cans, are generally made from a flexible material 12 comprising an elastomer, including various forms of rubber, or a polymer, or a combination thereof. In these easy-open can end transfer systems, the easy-open can ends 50 nest inside the circular openings 16 of a continuous, flexible transfer belt 10. The belt 10 is indexed or transferred periodically between various stations (not shown) as the easy-open end 50 is formed. The outer lips 52 of the easy-open ends 50 rest on the upper surface 14 of the belt 10 and surround circular openings 16 in the belt 10 through which a downward force is applied to the end 50 to maintain its position on the belt 10. This downward force, as illustrated by arrow 18, compresses the lip 52 of the end 50 against the upper surface 14 of the transfer belt 10. After a period of time that depends on the flexible material 12, the design of the lip 52 and other factors, the upper surface 14 of the transfer belt 10 is progressively worn around the openings and ring-shaped grooves 20 are formed and progressively deepen to a depth (d) with subsequent compression cycles of the easy open ends 50. As the grooves 20 deepen, the easy-open ends 50 begin to sink into the ring-shaped grooves 20 and negatively affect the performance of the belt transfer system, and thereby the performance of the easy-open end manufacturing equipment. In particular, the portions 22 of the transfer belt 10 between the grooves 20 and the openings 16, which also may contain small debris portions 24 of the belt that have been abraded or otherwise worn from the belt during formation of the grooves (e.g., particles of the flexible material), begin to contact the circumferential sealing compound films 54 located within the upper recesses 56 in the easy open can ends 50, which are used to seal the easy-open can ends 50 to the cans (not shown). Contact of this debris 24 associated with the wear of the belt 10 with the sealing compound films 54 may contaminate the sealing compound films 54 and prevent them from properly sealing the easy-open can ends 50 to the cans. As a result of the belt wear process described above, the quality of the easy-open ends 50 is reduced and the life of the transfer belt 10 is also reduced, which result in higher scrap and increased unit costs for the easy open ends 50 and shorter belt 10 replacement intervals and higher equipment costs for the belt transfer systems. Easy-open ends 50 generally contain scored regions (not shown) and a pull tabs (not shown) that are attached to the ends 50 as part of the manufacturing process and can be leveraged to open a hole (not shown) in the lid defined by the scored region by pushing the scored region into the can. The easy open ends 50 may comprise various aluminum alloys, including aluminum alloys that also comprise magnesium, such as aluminum alloys 5052 or 5182, with various tempering heat treatments, or may also comprise tin plated steel, which generally has a different hardness than the aluminum alloys. Easy-open ends 50 may be formed from flat disks (not shown), such as circular disks, which are stamped from a coil of an aluminum alloy sheet and are transferred using belt 10 to a press (not shown), or a plurality of presses (not shown) that forms them into easy-open ends 50. The conversion press generally forms an integral rivet bubble (not shown) in the lid and scores the scored region for the opening, while concurrently forming the tabs in another die from a separate strip of aluminum. The tab is pushed over the bubble which is then flattened to form the rivet that attaches the tab to the easy-open end. The finished easy-open ends 50 are shipped to filling plants where they are attached to the can bodies after filling. The United States, Australia, and New Zealand almost universally use a can diameter slightly in excess of 65 mm that tapers on the filling/sealing end to a somewhat smaller easy-open end diameter. This size is almost universal in these countries for cans used to package various soft drinks, beers ready-mixed alcoholic drinks, other beverages and the like. European countries generally use can and easy-open ends 50 with a much narrower size of 52 mm for the packaging of similar items.

The present invention advantageously provides a wear-resistant, continuous, flexible transfer belt 110 capable of appropriately transferring easy-open can ends 150 while reducing wear proximate the belt openings 116, as illustrated in FIGS. 2-6 in several exemplary embodiments. The reduction in belt 110 wear provides a concomitant increase in the belt 110 life and decrease in scrap (i.e., increase in quality) of the easy-open ends 150 by preventing the transfer belt 110 from touching and contaminating the sealing compound film 154 of the easy-open end 150. The enhanced wear resistance of flexible transfer belt 110 is provided by a wear-resistant layer 126 located proximate the upper surface 114 of the transfer belt 110, either at or in the upper surface 114 or slightly below the upper surface 114 of the transfer belt 110 at a depth (d) sufficient to prevent contact between the upper surface 114 and the sealing compound film 154, or to extend the time required for such contact to occur during use of the belt versus belts that do not include wear-resistant layer 126. The depth may vary depending on the design of the easy-open end, the material properties of the wear-resistant material and the transfer belt and other factors, as described herein.

Flexible transfer belt 110 may be used in the transfer systems of production equipment (not shown) for manufacturing easy-open can ends or lids 150, such as those used for enclosing a wide variety of beverage and other cans. Transfer belt 110 includes a flexible material 112 comprising an elastomer, such as various forms of rubber, or a polymer, or a combination thereof. Flexible transfer belt 110 is configured to receive and nest easy-open can ends 150 within a plurality of openings 116, such as circular openings. The belt 110 configured to be indexed or transferred periodically between various stations (not shown) as the easy-open end 150 is formed, and may include features suitable for use to provide such indexing (not shown). Flexible belt 110 is configured so that outer lips 152 of the easy-open ends 150 rest on the upper surface 114 and surround circular openings 116 through which a downward force is applied to the ends to maintain their nested position on the belt. This downward force, as illustrated by arrow 118, compresses the outer lips 152 against the upper surface 114.

Referring again to FIGS. 2-6, in an exemplary embodiment wear-resistant, continuous, flexible transfer belt 110 includes at least one lane 130 (FIGS. 2 and 3) that extends along an axis 132 of the belt, and in other exemplary embodiments may include a plurality of lanes (FIGS. 4-6). Each of the lanes 130 include a plurality of openings 116 therein that are each configured to receive an easy open end, as described herein. The openings 116 in a given lane 130 will generally have same size and shape. In flexible transfer belts 110 that include a plurality of lanes 130, the opening in the respective lanes may have the same or different sizes and shapes.

Flexible transfer belt 110 includes a flexible material 112 and wear-resistant layer 126 that includes a wear resistant material 128. The wear resistant layer 126 is disposed proximate the upper surface 114 of the flexible transfer belt 110 and extends outwardly from the openings 116. The wear-resistant layer 126 is configured to underlie the outer rim 152 of the easy-open end 150 and provide the wear-resistance described herein.

Figure 2:
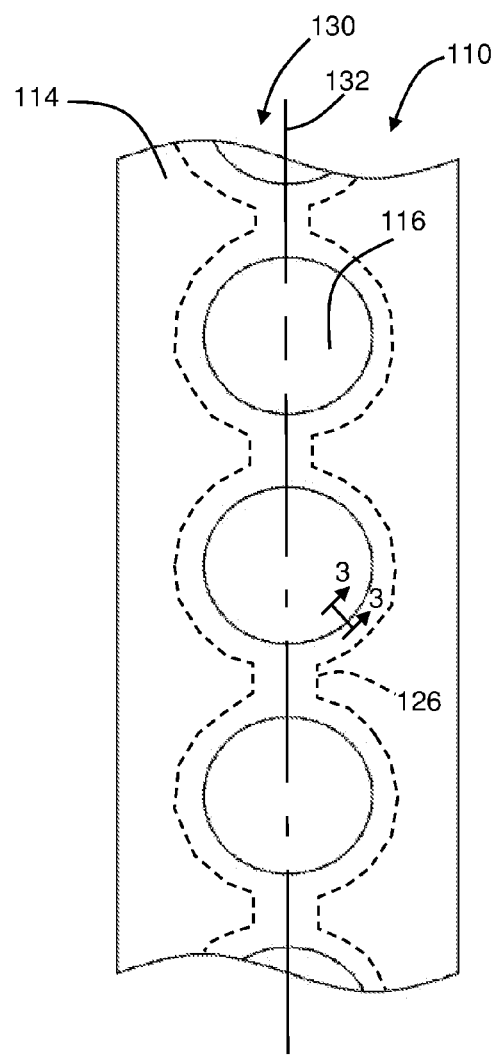
FIG. 2 is a top plan view of an exemplary embodiment of a wear-resistant, continuous, flexible transfer belt as disclosed herein.
Figure 4:
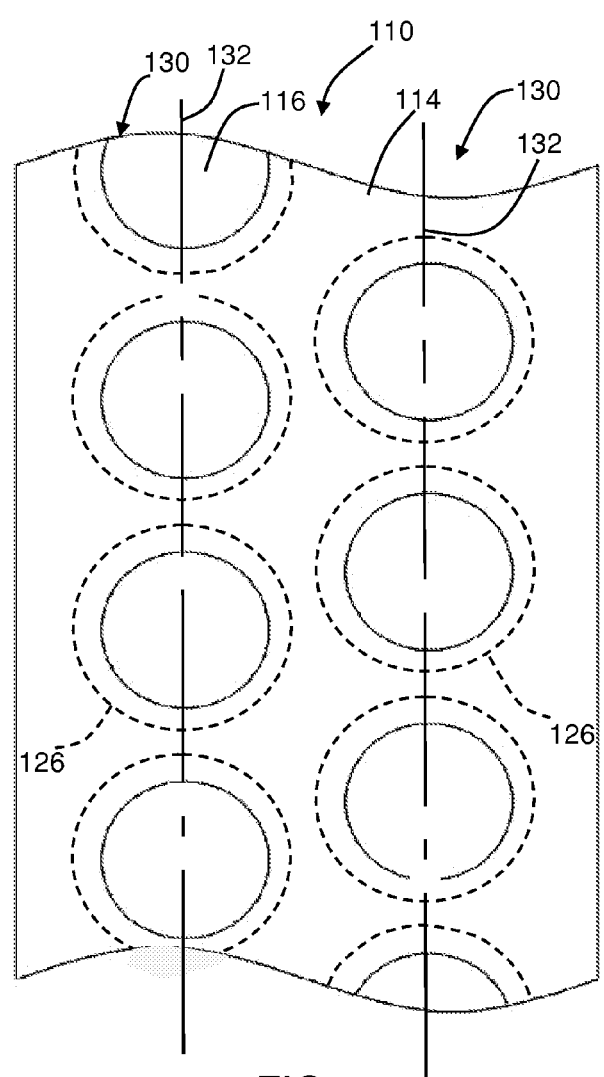
FIG. 4 is a top plan view of a second exemplary embodiment of a wear-resistant, continuous, flexible transfer belt as disclosed herein.
Figure 3:
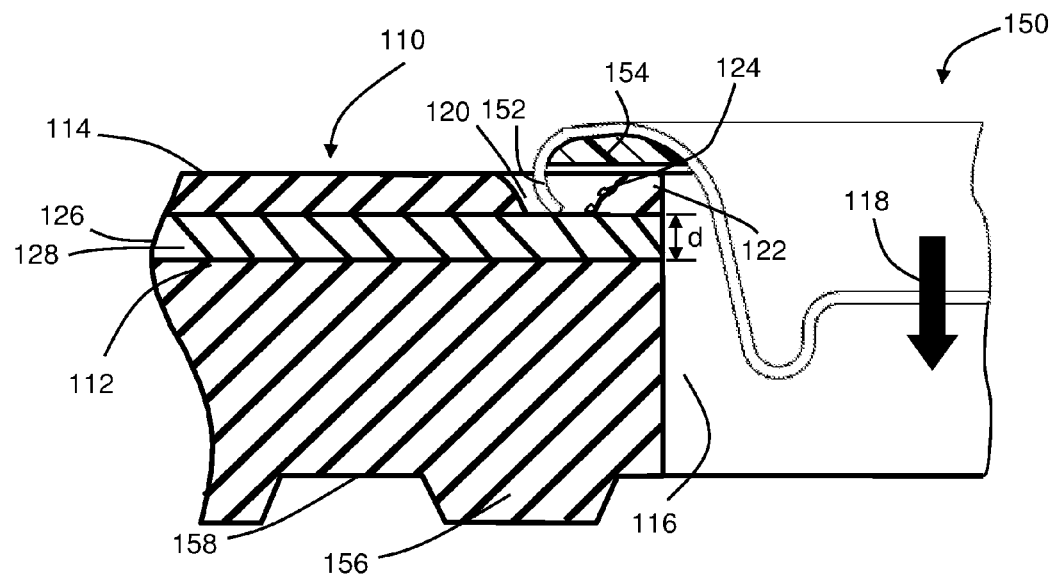
FIG. 3 is a cross-sectional view of the flexible belt of FIG. 2 taken along section 3-3.
Figure 6:
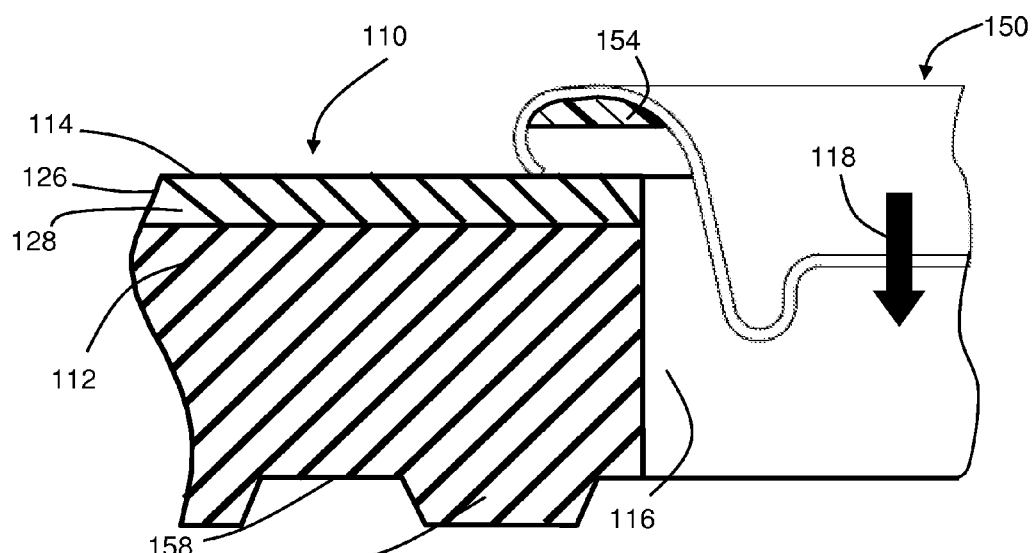
FIG. 6 is a cross-sectional view of the flexible belt of FIG. 5 taken along section 6-6.
Figure 5:
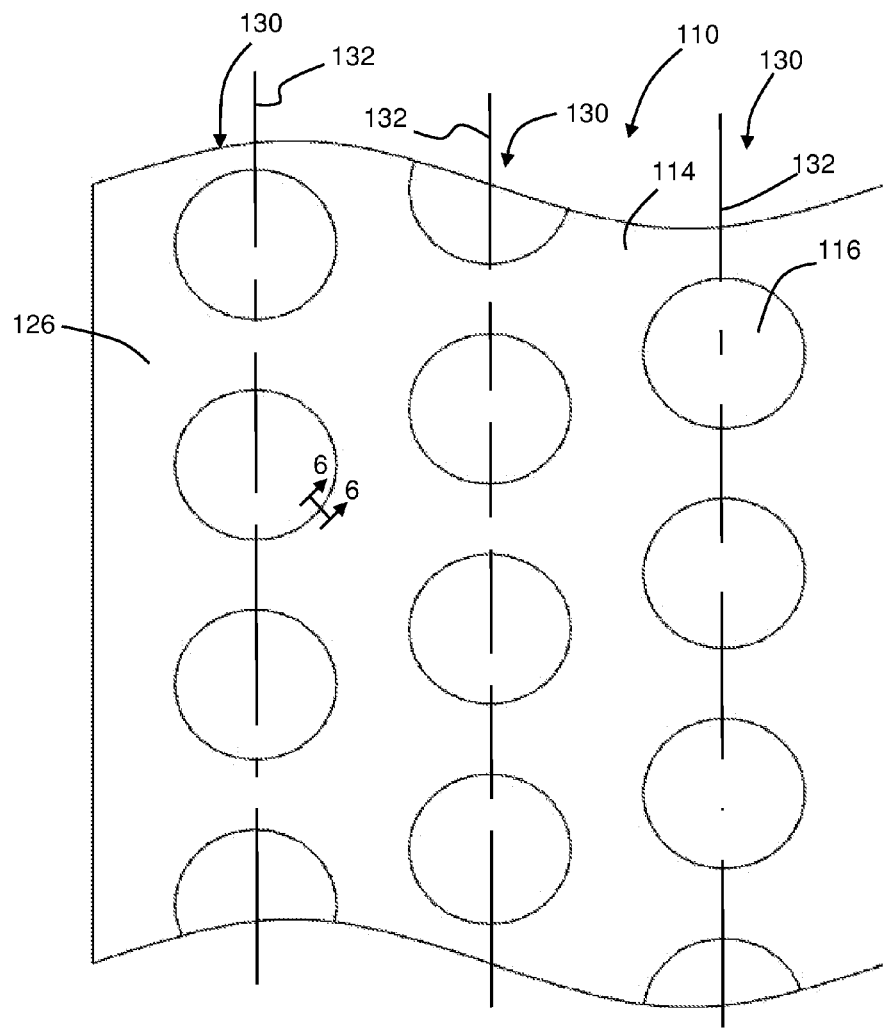
FIG. 5 is a top plan view of a third exemplary embodiment of a wear-resistant, continuous, flexible transfer belt as disclosed herein.

Wear-resistant layer 126 may extend as a continuous layer throughout substantially all of flexible transfer belt 110 or as a discontinuous layer. In one exemplary embodiment, wear-resistant layer 126 may extend as a continuous layer throughout substantially all of flexible transfer belt 110, either as a continuous layer comprising substantially all of the upper surface 114 of the belt (FIGS. 5 and 6) or a continuous layer that is embedded within the belt proximate upper surface 114 (FIGS. 2 and 3), as described herein. In another exemplary embodiment, a continuous wear-resistant layer 126 may also include a continuous patterned layer, wherein portions of the layer that do not underlie the outer rim 152 are removed, particularly to form a continuous repeating pattern within wear-resistant layer 126 so as to reduce the amount of wear-resistant material 128 used to form it. The continuous, patterned layer may be disposed on or in the upper surface 114 of the belt, or may be embedded within the belt proximate upper surface 114 (FIGS. 2 and 3). An exemplary embodiment of a discontinuous wear-resistant layer 126 is illustrated in FIG. 4. In this embodiment, discontinuous, wear-resistant layer 126 includes rings of wear resistant material 128 that are embedded with flexible transfer belt 110 proximate upper surface 114 so that the rings underlie the outer rim 152 of the easy-open end 150 and extend away from openings 116

Figure 7:
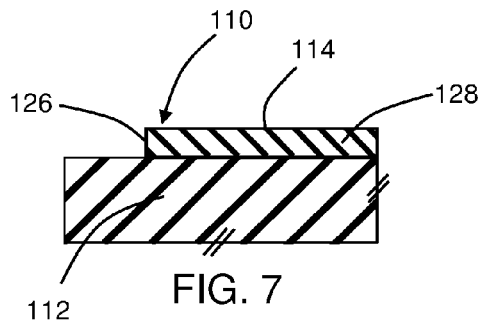
FIG. 7 is a schematic cross-sectional view of an exemplary embodiment of a wear-resistant, continuous, flexible transfer belt as disclosed herein having a wear-resistant layer disposed on the upper surface of the flexible belt.
Figure 8:
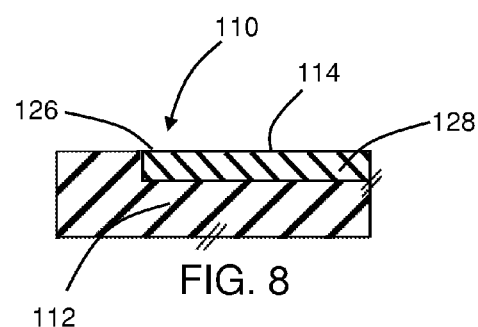
FIG. 8 is a schematic cross-sectional view of another exemplary embodiment of a wear-resistant, continuous, flexible transfer belt as disclosed herein having a wear-resistant layer disposed within the upper surface of the flexible belt.

In addition to the fact that wear resistant layer 126 may be continuously or discontinuously disposed throughout flexible transfer belt 110, wear-resistant layer 126 may be disposed as upper surface 114 (FIG. 6), or disposed on upper surface 114 (FIG. 7), or disposed so as to be embedded within upper surface 114 (FIG. 8). Further, whether continuous or discontinuous, wear-resistant layer 126 may be embedded within the flexible material 112 by a distance (d) from the upper surface as illustrated in FIG. 3. The distance d may be selected so that regardless of any wear that may occur within belt 110, the outer rim 152 of the easy-open end 150 will engage wear-resistant layer 126 prior to wearing flexible belt 110 sufficiently so that the belt, including any small debris portions 124 of the belt that have been abraded or otherwise worn from the belt during formation of a groove 120, do not contact circumferential sealing compound films 154. Distance d will depend on the design of the outer rim 152, the flexible material 112, the wear-resistant material 128, the thickness of the sealing compound film 154, the location of the wear-resistant layer 126 and other factors. In an exemplary embodiment that is suitable for use with many beverage can configurations, distance d may be selected to be about 1.5 mm or less.

Wear-resistant layer 126 may have any suitable thickness to achieve a predetermined wear-resistance, or amount of wear-resistance improvement, such as, for example, a wear-resistance improvement (e.g., operating lifetime improvement) over belts that do not include a wear-resistant layer 126. In an exemplary embodiment, wear-resistant layer 126 may have a thickness of about 1.5 mm or less.

The flexible material 112 of flexible transfer belt 110 may include any suitable flexible material. In an exemplary embodiment, flexible transfer belt 110 includes an engineering plastic, including various engineering thermoplastic and thermoset materials, or an elastomer, or a combination thereof. Suitable flexible materials 112 include polyurethane elastomer (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), ethylene butene terpolymers (EBDM), ethylene alpha olefin elastomers or silicone rubber, or a combination thereof. Ethylene alpha olefin elastomers include ethylene propylene copolymers (EPM), ethylene propylene diene terpolymers (EPDM), ethylene octene copolymers (EOM), ethylene butene copolymers (EBM) and ethylene octene terpolymers (EODM).

Wear-resistant layer 126 has a wear-resistance that is greater than that of flexible material 112 and may comprise any suitable wear resistant material 128. It may include the same material as flexible material 112 that also includes an embedded filler, including a wear-resistance member or material, that provides the increased wear-resistance. An example of a wear-resistance member includes a fibrous mesh, fibrous mat, felt, yarn or tensile cord embedded in the flexible material. An example of a wear resistant material includes wear-resistant filler, such as a plurality of wear-resistant particles, fibers, platelets and other filler morphologies. Wear-resistant material 128 may also include a different material that has a greater wear-resistance than flexible material 112. For example, if flexible material 112 is a synthetic rubber, wear-resistant material may include a more wear-resistant synthetic rubber, such as one having a higher durometer, or an engineering plastic. Where wear-resistant material 128 is a different material, it may also include an embedded filler as described herein.

Suitable wear-resistant materials 126 include polyurethane elastomer (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), ethylene butene terpolymers (EBDM), ethylene alpha olefin elastomers or silicone rubber, or a combination thereof. Ethylene alpha olefin elastomers include ethylene propylene copolymers (EPM), ethylene propylene diene terpolymers (EPDM), ethylene octene copolymers (EOM), ethylene butene copolymers (EBM) and ethylene octene terpolymers (EODM).

The embedded filler in any suitable form may include a metal, ceramic, inorganic material or polymer, or a combination thereof. For example, where the embedded filler includes an embedded tensile cord, the tensile cord may include a metal, a ceramic, an inorganic material or a polymer, or a combination thereof. Suitable tensile cord materials include a plurality of polyester, carbon, metal, nylon, aramid, including para-aramids such as poly para-phenyleneterephthalamide (e.g., Kevlar® which is manufactured by DuPont Corporation) or glass fibers, or a combination thereof. Tensile cord may have any suitable and/or conventional configuration such as plied or braided, and generally may comprise one or a plurality of strands which may themselves be of any suitable and/or conventional configuration such as plied or braided, and generally may comprise one or a plurality of yarns. "Yarn" refers to a bundle of filaments or fibers in the form as received from a yarn manufacturer, which may include twisted yarn or yarn with no twist. "Strand" refers to a yarn or yarns that have been twisted, plied or braided as an intermediate step in forming a cord.

The flexible transfer belt 110 may also include other belt features, including indexing features. In an exemplary embodiment, indexing features include a plurality of drive teeth 156 formed in a lower surface 158 of the belt that are configured to engage a moveable drive gear or another movable member of the transfer system having mating teeth formed therein.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A wear-resistant, continuous, flexible transfer belt comprising at least one lane that extends along an axis of the belt, the at least one lane having a plurality of openings therein that are configured to receive an easy open end, the transfer belt comprising a flexible polymer or elastomer material, or a combination thereof, and a wear resistant layer comprising a wear resistant material, the wear resistant layer disposed proximate an upper surface of the belt and extending outwardly from the opening, wherein the wear resistant layer underlies an outer rim of the easy-open end.

2. The transfer belt of claim 1, wherein the wear resistant layer is a continuous layer over substantially all of the upper surface of the belt.

3. The transfer belt of claim 1, wherein the wear resistant layer is a continuous patterned layer or a discontinuous layer.

4. The transfer belt of claim 1, wherein the wear resistant layer is disposed on, as or within the upper surface of the belt.

5. The transfer belt of claim 1, wherein the wear resistant layer has a thickness that is less than or equal to about 1.5 mm.

6. The transfer belt of claim 1, wherein the flexible material comprises polyurethane elastomer (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), ethylene butene terpolymers (EBDM), ethylene alpha olefin elastomer or silicone rubber, or a combination thereof.

7. The transfer belt of claim 1, wherein the wear resistant material comprises an elastomer, an engineering plastic or a combination thereof.

8. The transfer belt of claim 7, wherein the wear resistant material comprises polyurethane elastomer (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), ethylene butene terpolymers (EBDM), ethylene alpha olefin elastomer or silicone rubber, or a combination thereof.

9. The transfer belt of claim 7, wherein the wear resistant material further comprises an embedded filler comprising a plurality of discrete fibers, a plurality of particles, a fibrous mesh, a fibrous mat, or a yarn, or a combination thereof.

10. The transfer belt of claim 9, wherein the embedded filler comprises a metal, a ceramic, an inorganic material or a polymer, or a combination thereof.

11. The transfer belt of claim 1, further comprising a bottom surface have a plurality of drive teeth formed therein.

12. The transfer belt of claim 1, wherein the transfer belt comprises a plurality of lanes, each lane having a plurality of openings therein that are each configured to receive an easy open end.

13. The transfer belt of claim 12, wherein the plurality of openings of each lane have the same opening size.

14. The transfer belt of claim 12, wherein the plurality of openings are circular openings.

15. A wear-resistant, continuous, flexible transfer belt comprising at least one lane that extends along an axis of the belt, the at least one lane having a plurality of openings therein that are configured to receive an easy open end, the transfer belt comprising a flexible material and a wear resistant layer comprising a wear resistant material, the wear resistant layer disposed proximate an upper surface of the belt and extending outwardly from the opening, wherein the wear resistant layer underlies an outer rim of the easy-open end, and wherein the wear resistant layer is embedded within the flexible material by a distance (d) from the upper surface.

16. The transfer belt of claim 15, wherein d is less than or equal to about 1.5 mm.

17. A wear-resistant, continuous, flexible transfer belt comprising at least one lane that extends along an axis of the belt, the at least one lane having a plurality of openings therein that are configured to receive an easy open end, the transfer belt comprising a flexible material and a wear resistant layer comprising a wear resistant material, the wear resistant layer disposed proximate an upper surface of the belt and extending outwardly from the opening, wherein the wear resistant layer underlies an outer rim of the easy-open end, and wherein the wear resistant material comprises an elastomer, an engineering plastic or a combination thereof, and wherein the wear resistant material further comprises an embedded tensile cord.

18. The transfer belt of claim 17, wherein the embedded tensile cord comprises a metal, a ceramic, an inorganic material or a polymer, or a combination thereof.

19. The transfer belt of claim 17, wherein the embedded tensile cord comprises a plurality of polyester, carbon, metal, nylon, aramid or glass fibers, or a combination thereof.

* * * * *